R. F. RISLEY.
CORN-PLANTER.

No. 174,855. Patented March 14, 1876.

Witnesses:
Chas. L. Gill
Fred R. Goodridge

Inventor:
R. F. Risley
by his attys,
Cox & Cox

UNITED STATES PATENT OFFICE.

ROBERT F. RISLEY, OF BRECKINRIDGE, MISSOURI.

IMPROVEMENT IN CORN-PLANTERS.

Specification forming part of Letters Patent No. 174,855, dated March 14, 1876; application filed August 7, 1875.

*To all whom it may concern:*

Be it known that I, ROBERT F. RISLEY, of Breckinridge, Caldwell county, Missouri, have invented new and useful Improvements in Corn-Planters, of which the following is a specification, reference being had to the accompanying drawings:

My invention relates to devices that have been classed as corn-planters, and has for its object the production of an implement of improved construction, and especially one which, while readily operated with enhanced results, is cheap, durable, and easily kept in order.

Figure 1:
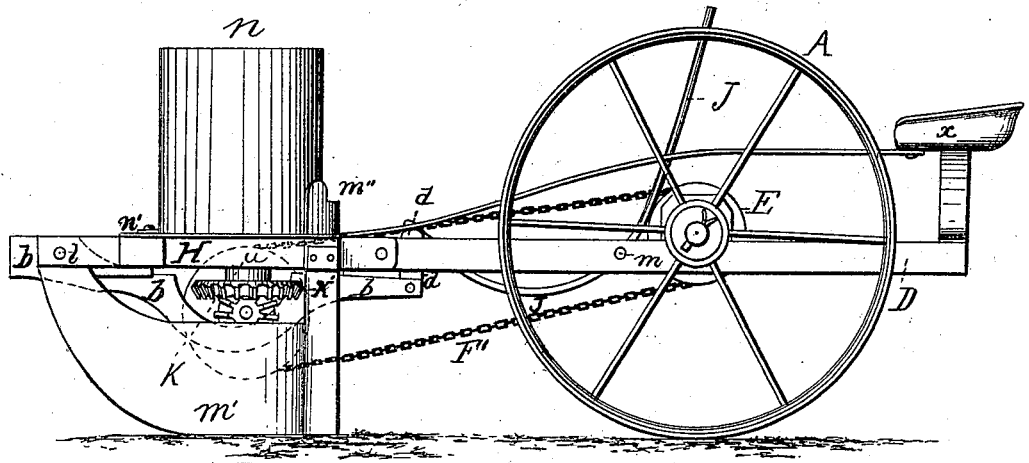
Figure 2:
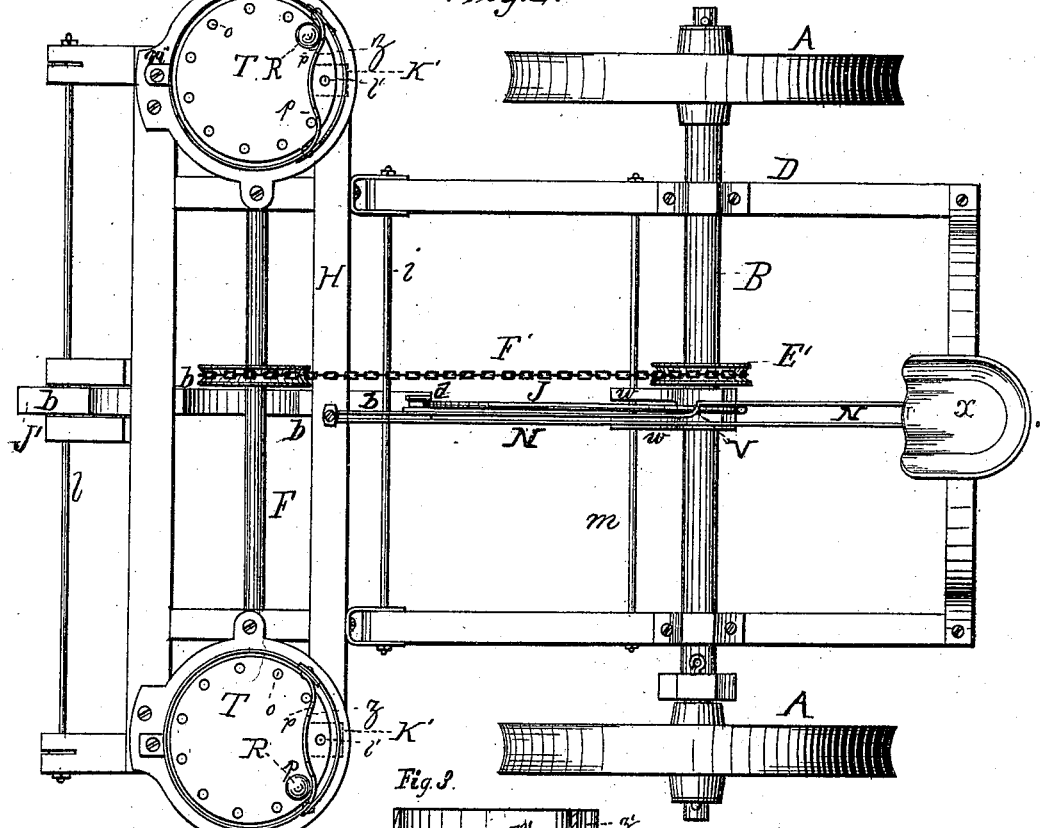
Figure 3:
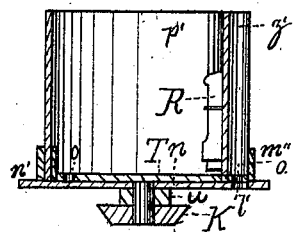

Figure 1 is a side elevation of a device embodying the elements of the invention. Fig. 2 is a top view of same.

A represents the wheels of the device, which are of suitable size, and fashioned in such manner that their outer peripheries are concave. These wheels are connected by the axle B, which has its bearings upon the frame D, and is provided with the pulley-wheel E, having check-pins (not shown) and connected by the endless chain F′ with the wheel E′, of similar construction, secured at a point opposite on the axle F. Thus the movement of the axle B serves to impart motion to the axle F, which extends on each side through bearings placed on the under side of frame H, the ends of the axle having the bevel-gear wheel K, which engages a corresponding wheel, K′, at the lower end of an upright axle (not shown) extending through the sleeve $u$, fastened to the center of the bottom of the hopper, into the dropper, the upper end of the axle being secured at the center of the cut-off T, which is a circular disk, and moves in close relation to the bottom of the hopper $n$, its diameter corresponding nearly with that of the hopper, and provided near its periphery with a series of perforations, $o$. The base $n'$ of the hopper $n$ extends beyond the lower edge of its barrel $p'$, and is properly secured to the sides of the frame H, having at its rear the vertical guard $m''$, adjacent which the barrel $p'$ is indented with the re-entrant arch $z$, at the sides of the base of which are the seed-slots $z'$. At a point opposite the center of the space between the lower edges of the guard $m''$ and arch $z$ is provided the aperture $l'$ in the base $n'$, over which the apertures $o$ pass as the cut-off T revolves. Upon the inside of the barrel $p'$, adjacent the seed-slot $z'$, and on that side from which the movement of the disk proceeds, is placed the check-post R, the bottom of which is faced with rubber or a brush, and impinges lightly upon the upper surface of the cut-off T. Thus the hopper being filled, and the cut-offs in motion, the seed is carried by the apertures $o$ over the aperture $l'$, down a tube, below which it falls in rear of the shoe $m'$, all surplus seed being kept in the barrel $p'$ by the check R, and the operation of delivering seed to the aperture $l'$ being plainly observable from the driver's seat. The front ends of the side bars of the frame H are connected by the pivot-rod $l$, secured further to the frame by the pivot-stand $t'$, between which is placed on the rod $l$ the front end of the arched connecting-rod $b$, the horizontal parts of which, when the rod is elevated, touch the under side of the frame H, the arched part passing under the axle F, and the rear end having the vertical pivot-post $d$, in the upper part of which is pivoted the front end of the bent lever J, which is pivoted upon the rod $m$, between the ears of the pivot-post $w$, the upper end of the lever standing in convenient relation to the driver's seat $x$, properly placed near the rear of the frame D, which is hinged to the frame F by the pivot-rod $i$.

To the rear of the frame H is secured the front of the guide N, having the check-shoulder V, to prevent the lever moving too far forward, the rear of the guide being secured under the driver's seat. The rod $b$ forms the rear of the tongue by which the device is propelled.

It is plain that by operating the lever the driver can elevate the frame H, or increase its pressure, as desired, thus enabling him to readily pass over an obstacle, or run a deeper furrow, as desired.

It is obvious that the endless chain not only assists in connecting the frames, but also permits a free movement of either thereof.

What I claim as my invention, and desire to secure by Letters Patent, is—

The bent lever J, having its front end pivoted to the rear of the arched bar $b$, pivoted on the bar $l$, and its rear pivoted near the center of the frame D, in combination with the slotted guide J, having its front secured to the frame H, its rear to the driver's seat $x$, substantially as and for the the purpose expressed.

In testimony that I claim the foregoing improvements in corn-planters, as above described, I have hereunto set my hand and seal.

ROBERT F. RISLEY. [L. S.]

Witnesses:
 S. B. GIFFORD,
 EDWIN OÑAR.